US005949680A

United States Patent [19]

Kettelkamp

[11] Patent Number: 5,949,680

[45] Date of Patent: Sep. 7, 1999

[54] PRINTED PLASTIC CARD JOB CONTROL SYSTEM

[75] Inventor: John B. Kettelkamp, Glen Ellyn, Ill.

[73] Assignee: Perfect Plastic Printing Corporation, St. Charles, Ill.

[21] Appl. No.: 08/864,123

[22] Filed: May 28, 1997

[51] Int. Cl.[6] .......................... G06F 19/00; G06K 19/10

[52] U.S. Cl. .............................. 364/468.06; 364/468.24; 235/380

[58] Field of Search ........................ 364/468.23, 468.24, 364/479.11, 468.06; 283/72, 904; 400/127; 156/256; 235/380

[56] References Cited

U.S. PATENT DOCUMENTS

| | | | |
|---|---|---|---|
| 5,380,044 | 1/1995 | Aitkens et al. | 283/67 |
| 5,410,642 | 4/1995 | Hakamatsuka et al. | 395/113 |
| 5,637,174 | 6/1997 | Field et al. | 156/256 |
| 5,757,431 | 5/1998 | Bradley et al. | 348/373 |

FOREIGN PATENT DOCUMENTS

| | | | |
|---|---|---|---|
| 9-319834 | 12/1997 | Japan | G06K 17/00 |

*Primary Examiner*—Emmanuel L. Moise
*Assistant Examiner*—Shelly A Chase
*Attorney, Agent, or Firm*—Joseph P. Gastel; Walter W. Duft

[57] ABSTRACT

A job control system for manufacturing laminated printed plastic cards includes a cutting apparatus for cutting job number encoded sheets of plastic card stock. Associated with the cutting apparatus is a scanning device for scanning sheets of the plastic card stock that have been loaded in the cutting apparatus and for producing a scanner output containing the job number encodation. A control system is responsive to the scanner output and to an input job control signal for disabling the cutting apparatus from cutting the sheets of plastic card stock loaded therein unless the sheets of plastic card stock conform to a predetermined job specification.

25 Claims, 8 Drawing Sheets

Fig. 6.
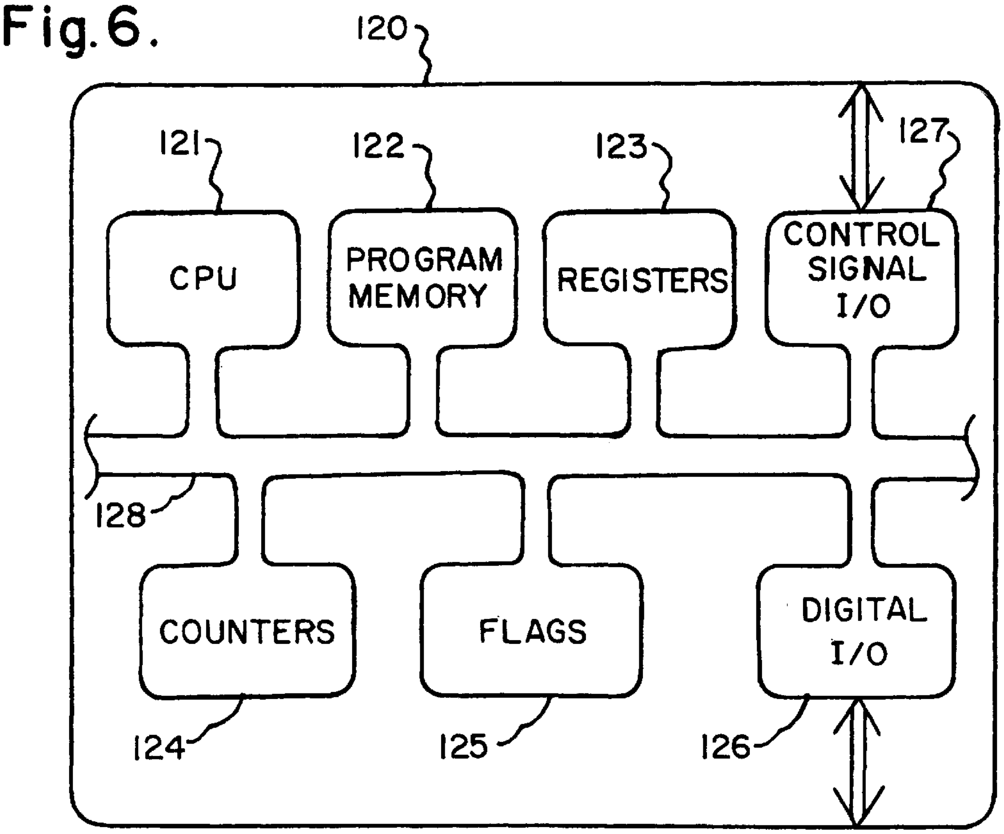
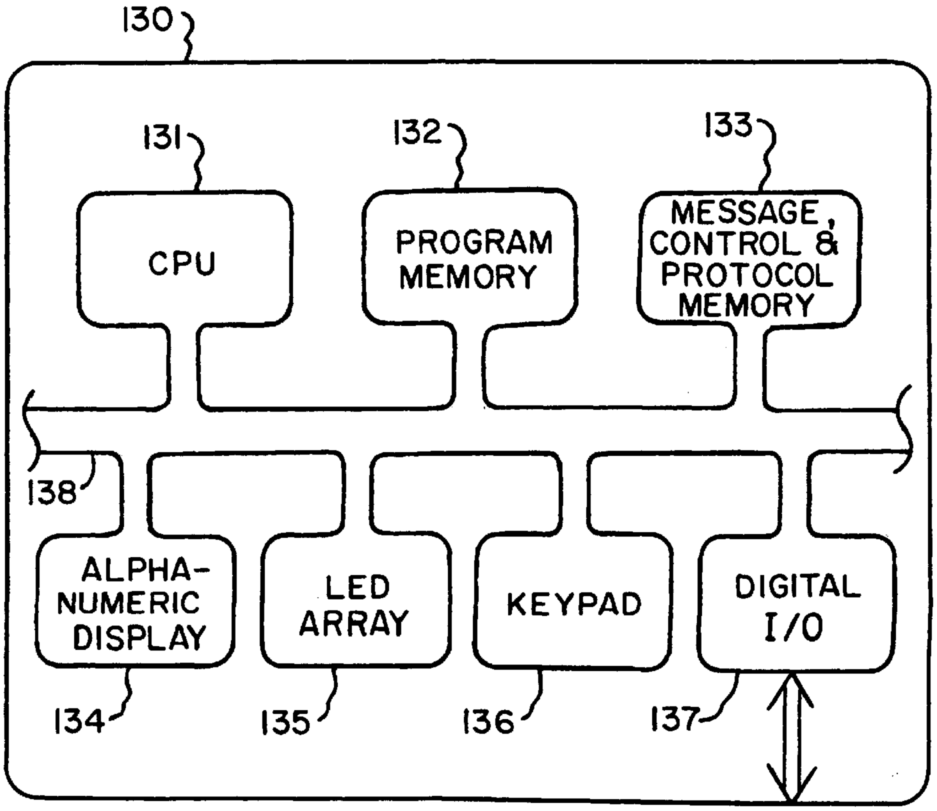
Fig. 7.

Fig. 11.
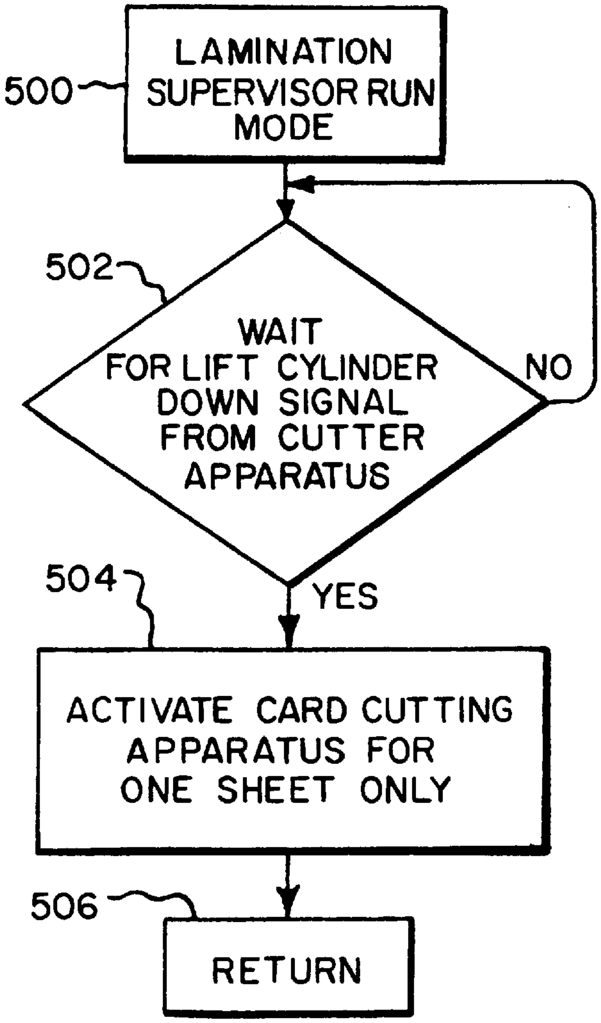
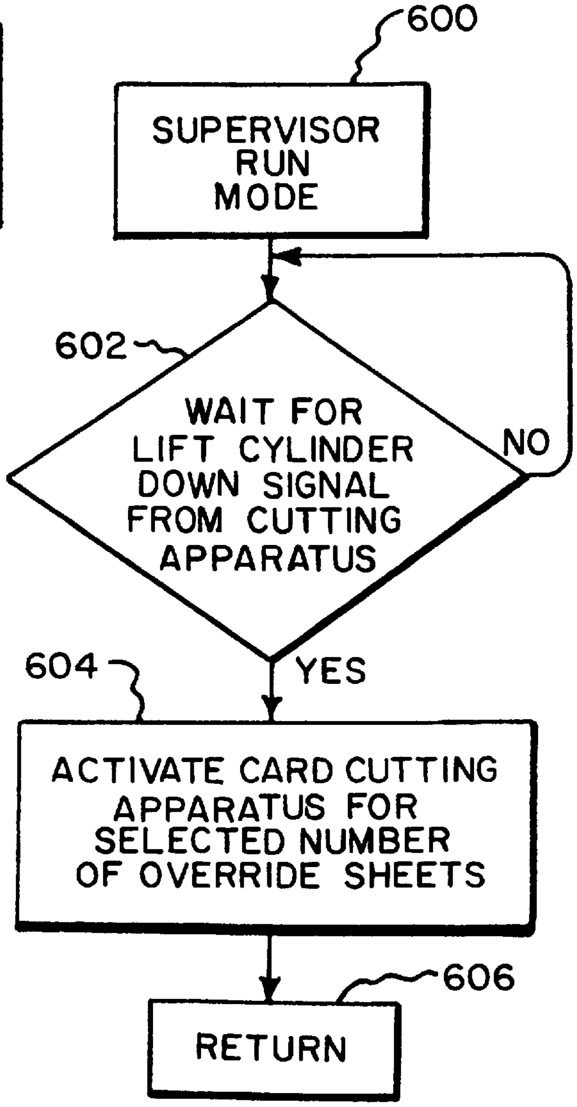
Fig. 12.

PRINTED PLASTIC CARD JOB CONTROL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The invention relates generally to the manufacture of printed plastic card products, including laminated credit cards, debit cards, ATM cards and the like. More specifically, the invention relates to a system for mass producing printed plastic cards while maintaining control of the plastic card sheet stock used in the production thereof to ensure that only correct card stock corresponding to applicable job specifications is used. Still more particularly, the invention concerns a printed plastic card job control system that prevents plastic card production using unauthorized sheets of plastic card stock, but which permits such production under limited circumstances by authorized personnel.

2. Description of the Prior Art

Printed plastic cards used for financial and other purposes are becoming increasingly prevalent. Many individuals, for example, have come to rely on credit cards as an indispensable alternative to cash currency. Banks and other lending institutions issue millions of credit cards annually just to keep up with the demand for such products. A consequence of such demand is that card manufacturers, if they are to remain competitive, must have the capability of mass producing printed plastic card products as cheaply and efficiently as possible while maintaining high quality standards. Quality assurance means sustaining a high production output level across a product line containing a diverse assortment of printed plastic cards without error.

Credit cards vary widely by type (e.g. VISA™, MASTERCARD™, AMERICAN EXPRESS™, etc.) and issuing entity (e.g. Chase Manhattan Bank™, Chemical Bank™, United Airlines™, etc.). Such cards come in a variety of color schemes and are often embellished with stylized images that add to their consumer appeal. For a card manufacturer producing multiple runs of such cards in a continuous manufacturing process, it is essential that the correct card stock be used for the correct print job in accordance with the designated card type, issuing entity, and color scheme/image pattern. A bank customer ordering tens of thousands of credit cards at a time cannot tolerate cards that have been mixed with cards from other jobs. They will reject the shipment and demand that the job be rerun, all at great expense to the manufacturer.

Conventional manufacturing methods lack adequate safeguards to ensure that an erroneous mixing of card stock does not occur. In a typical printed plastic card manufacturing facility, sheets of raw plastic sheet stock are sized to accommodate a predetermined number of cards (e.g. seventy-two) arranged in a matrix of predetermined size (e.g. six columns by twelve rows). The sheet stock is first placed in a printing press where it is printed with identical image patterns corresponding to one face of the cards to be produced. A similar piece of sheet stock is then printed with image patterns corresponding to the opposite face of the cards to be produced. The two pieces of sheet stock are bonded back-to-back to form a two-ply printed sheet. This printed sheet is then laminated and placed in a cutting apparatus that cuts the sheet into individual cards. Following cutting, the cards are arranged together and boxed for shipment to the customer.

A problem arises if, following the lamination process, a sheet printed for one job is placed in the cutting apparatus in lieu of a sheet printed for another job. This can happen in a variety of ways. For example, a printed sheet from a previous job might be left in the cutting apparatus and used at the commencement of a new job. This might happen if a low priority job is interrupted so that a higher priority job can be completed first. Under such circumstances, the cutting apparatus operator might lose track of which printed sheets are loaded in the cutting apparatus for use on a given job. The result could be a production run of tens of thousands of correct cards that contains a small number of incorrect cards.

Accordingly, there is an evident need for an automated system for ensuring that only card stock printed according to a predetermined job specification will be used for a particular job, and no other. What is required is an apparatus and method for accomplishing this objective in a low cost manner using existing printing and cutting equipment, yet which will affirmatively and consistently prevent the production of any plastic laminated card product that does not conform to a predetermined job specification. An important additional requirement is that the system be flexible enough to permit selected nonconforming sheets to be cut for test purposes, or if the sheet specification for a given job must be overridden in some way during production.

BRIEF SUMMARY OF THE INVENTION

It is an object of the present invention to provide an automated system for use in manufacturing printed plastic cards which will ensure that only card stock printed according to a predetermined job specification will be used for a particular job, and no other.

It is a further object of the present invention to provide an automated system for use in manufacturing printed plastic cards which will affirmatively and consistently prevent the production of any plastic laminated card product that does not conform to a predetermined job specification.

It is a further object of the present invention to provide a system for use in manufacturing printed plastic cards in accordance with the first and second objects, and which can be manually overridden by authorized personnel so that occasional nonconforming sheets cannot be produced for test purposes, or if the sheet specification for a given job must be overridden in some way during production.

It is a further object of the present invention to provide a system for accomplishing the foregoing objects in a low cost manner using existing printing and cutting equipment.

In accordance with the present invention, a job control system for manufacturing laminated printed plastic cards includes a cutting apparatus for cutting job number-encoded sheets of plastic card stock. Associated with the cutting apparatus is a scanning device for scanning sheets of the plastic card stock that have been loaded in the cutting apparatus and for producing a scanner output containing the job number encodation. A control system is responsive to the scanner output and to an input job control signal for disabling the cutting apparatus from cutting the sheets of plastic card stock loaded therein unless the sheets of plastic card stock conform to a predetermined job specification. An override function is provided to permit authorized personnel to cut a predetermined number of sheets despite a job number mismatch.

BRIEF DESCRIPTION OF THE SEVERAL VIEWS OF THE DRAWING

The foregoing and other features and advantages of the invention will be apparent from the following more particular description of a preferred embodiment of the invention, as illustrated in the accompanying Drawing, in which:

FIG. 6 is a schematic representation of a job controller constructed in accordance with the present invention;

FIG. 7 is a schematic representation of an operator interface constructed in accordance with the present invention;

FIG. 11 is a flow diagram showing additional process steps performed by the printed plastic card job control system of FIG. 5; and FIG. 12 is a flow diagram showing additional process steps performed by the printed plastic card job control system of FIG. 5.

DETAILED DESCRIPTION OF THE INVENTION

Figure 1:
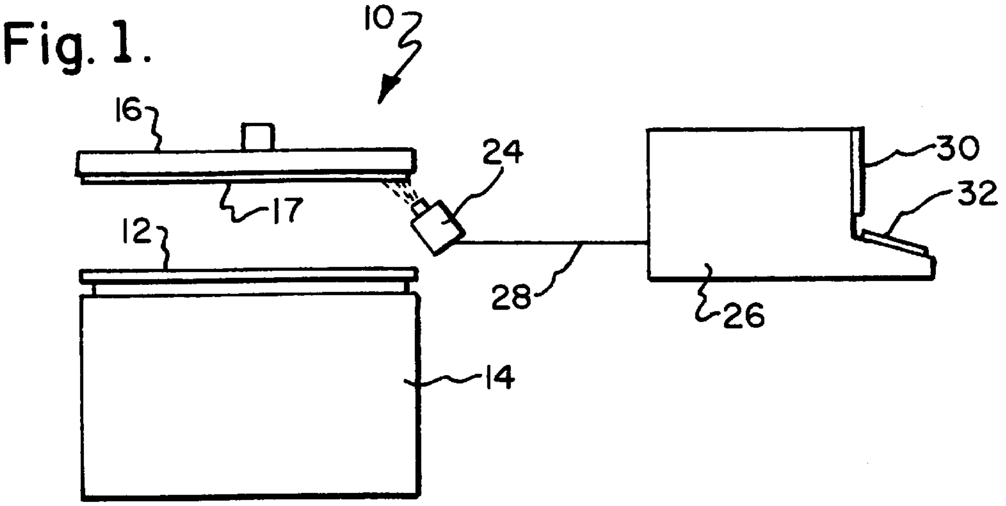
FIG. 1 is a diagrammatic representation of a printing apparatus constructed in accordance with the present invention.

Turning now to the Drawing, wherein like reference numbers designate like elements in all of the views, FIG. 1 illustrates a printing apparatus 10 of the type commonly used to print images on plastic sheet stock. The printing apparatus 10 could be a one-color press, a two-color press or a four-color press, as is known in the art. A plastic sheet 12 is shown in a printing position on a base portion 14 of the printing apparatus 10. The plastic sheet 12 is ready to be printed by an imaging portion 16 of the printing apparatus. The imaging portion 16 includes a printing plate 17 whose imaging surface is formed using conventional photoengraving or photolithographic techniques.

Figure 2:
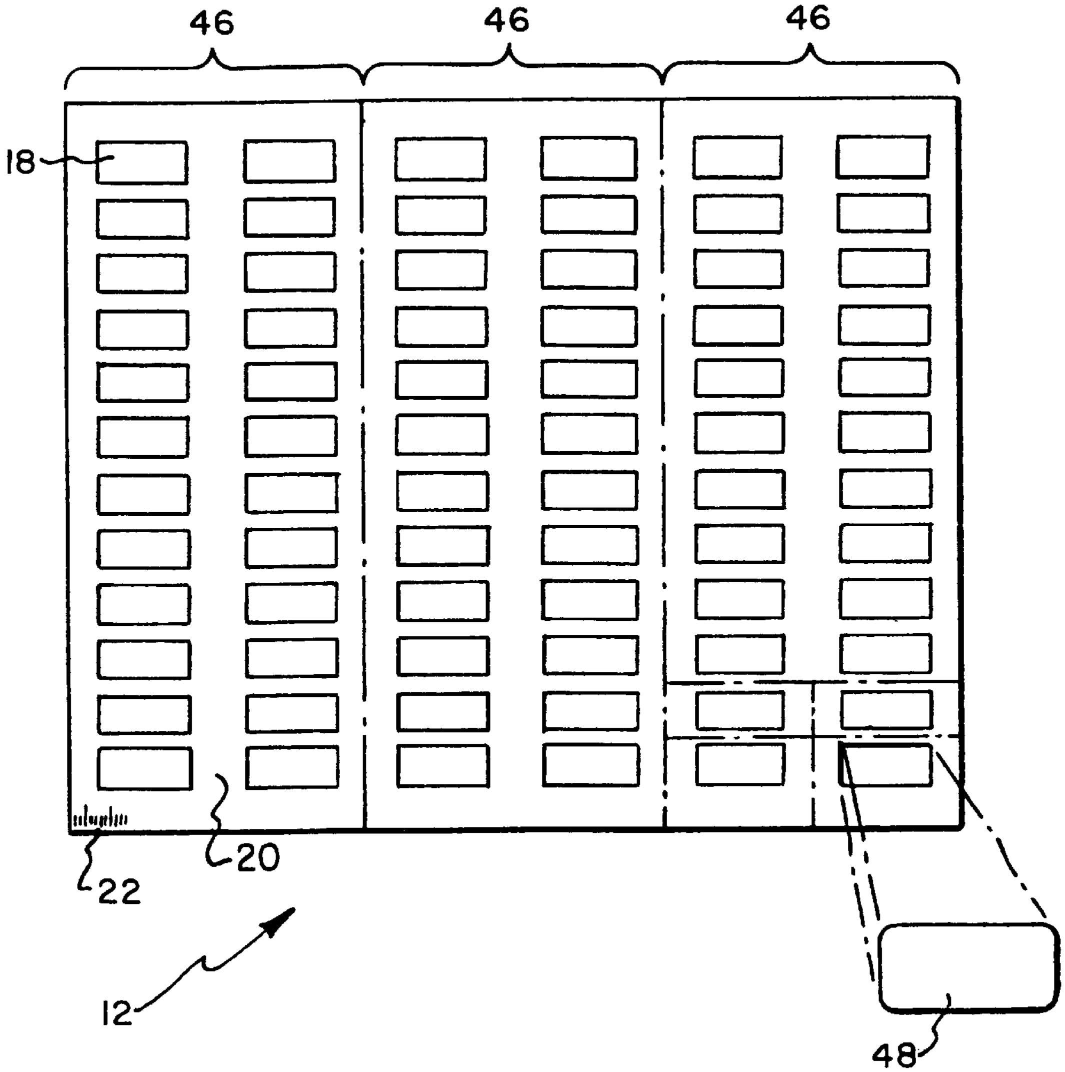
FIG. 2 is a plan view of a job encoded printed plastic card sheet produced by the printing apparatus of FIG. 1.

In accordance with common practice in the industry, the plastic sheet 12 is printed with multiple identical images corresponding to, for example, a credit card. FIG. 2 illustrates a typical pattern of credit card images 18 that could be printed on the plastic sheet 12. The credit card images 18 are printed in a matrix comprising six (6) columns and twelve (12) rows of the images. In industry parlance, the areas between the rows and columns are referred to as "gutters." The gutters are designated by numeral 20 in FIG. 2.

The gutters 20 provide areas of separation between the individual credit card images 18. Advantageously, they can be used print additional images that assist in the manufacturing process. These include color bar test patterns, referred to in the industry as a "color bar burn," which are used to check the quality of the colors being printed by the printing apparatus 10. A plurality of alignment marks are also typically printed in the gutters 20 to assist in cutting the sheet 12 to produce the individual credit cards.

In addition to the standard color bar test patterns and alignment marks, the invention contemplates that one or more additional markings, such as a job number 22, will be printed on the plastic sheet 12. The job number 22 is used to determine whether the sheet 12 is valid, such that it can be processed into finished credit cards, or invalid, such that subsequent processing will be halted. The job number 22 corresponds to the credit card images 18 that are printed on the plastic sheet 12. For each credit card image 18 being printed during a given printing run, there will be a single corresponding job number to identify that run. While the job number 22 can be recorded in any form, it is preferably recorded in machine readable form, and most preferably recorded in the universal bar code format. While FIG. 2 shows that the job number 22 is printed at only one location on the plastic sheet 12, there could be any desired number of such markings.

The job number 22 is preferably placed in the gutters 20 with the color bar burn and the alignment marks. Alternatively, the job number could be placed within the credit card images 18 themselves. Advantageously, the photographic film used for the job number burn can contain the job number in human readable form, e.g. alphanumeric form, as well as in bar code form. This allows an operator to check the film and verify that the correct job number is being burned onto the plate 17. For security reasons, the human readable version of the job number is preferably not burned into the plate; only the bar code image is transferred.

FIG. 1 shows that the printing apparatus 10 is equipped with a scanning system 24. The scanning system 24 is preferably a bar code scanner and is used to scan the printing plate 17 before a plastic sheet 12 is printed to verify that the plate contains the correct job number 22, and that the job number is legible. The scanning system 24 provides its output to a digital processing apparatus 26 via a connector cable 28. The digital processing apparatus preferably has a video output display 30 and a keyboard input device 32. It is programmed to evaluate the bar code number 22 read by the scanning system 24 and verify that it corresponds to a correct job number entered by the operator via the keyboard 32.

Following verification of the job number 22 by the digital processing apparatus 26, the printing apparatus 10 prints one or more of the plastic sheets 12 with the credit card images 18, together with the color bar burn and alignment marks, and the job number 22, thus forming job-encoded printed plastic card sheets. After each plastic sheet 12 is printed, it is bonded back-to-back to a mating printed plastic sheet (not shown) and the resultant two-ply sheet is laminated to protect the imaged surfaces thereof against damage.

Figure 3:
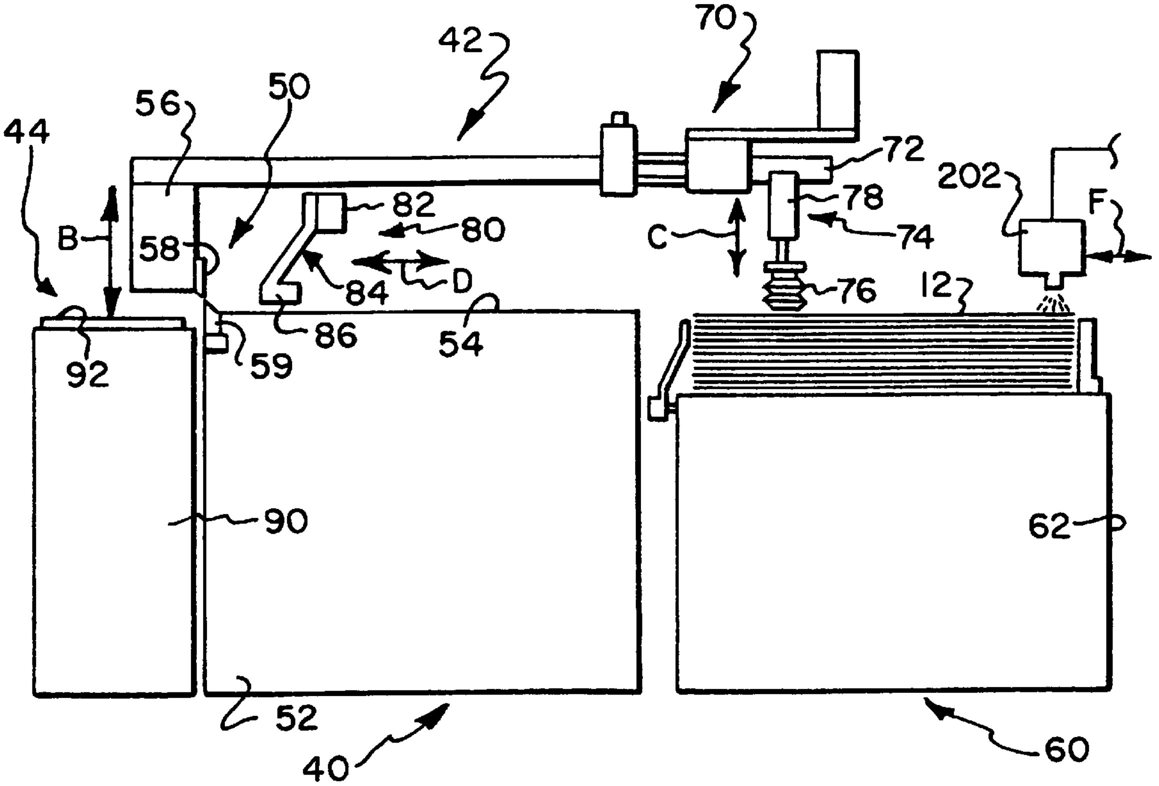
FIG. 3 is an elevational side view of a cutting apparatus constructed in accordance with the present invention.
Figure 4:
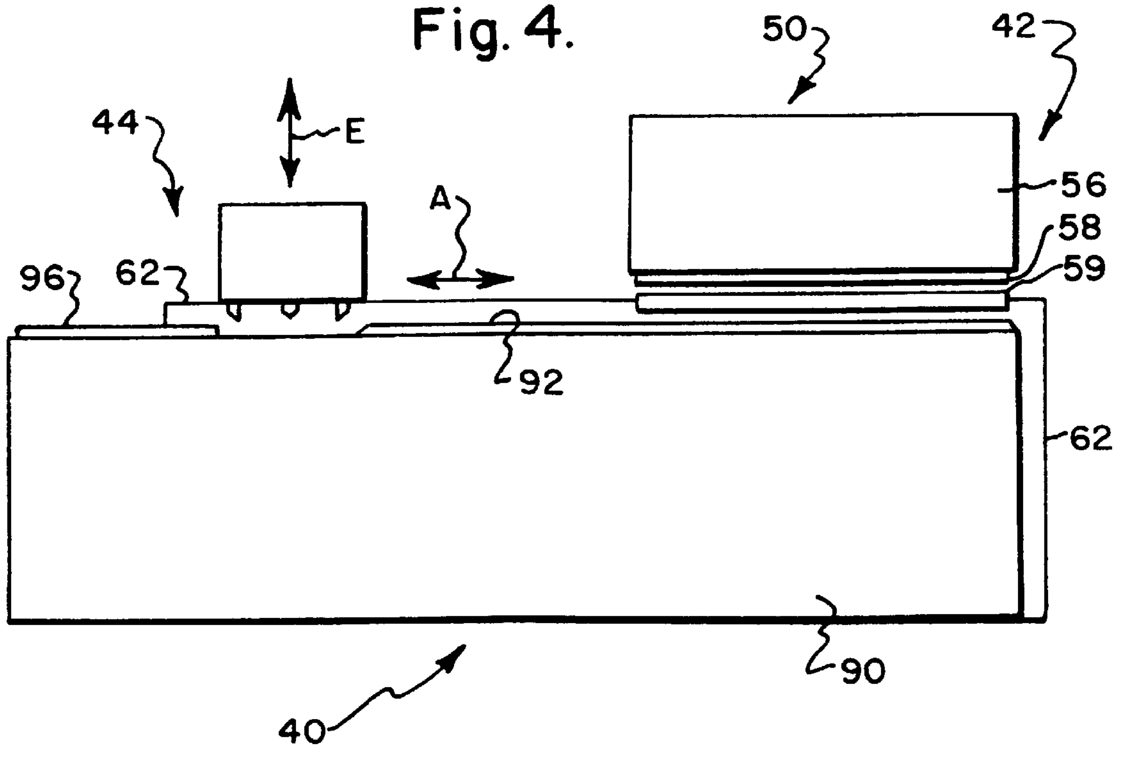
FIG. 4 is an end view of the cutting apparatus of FIG. 3.

Referring now to FIGS. 3 and 4, the two-ply printed plastic sheets, designated by reference numeral 12*a*, are processed by a cutting apparatus 40 into individual credit cards. The cutting apparatus 40 conventionally includes two distinct cutting stations 42 and 44, which are known in the art as an auto guillotine unit and a punch press unit. The guillotine unit 42 and the punch press unit 44 are commercially available products and can be purchased, for example, from Oakwood Design of Letchworth, Hertfordshire, England.

The guillotine unit 42 is designed to cut the printed plastic sheets 12*a* into a selected number of strips. For each printed plastic sheet 12*a*, it is efficient to cut the sheet into three strips that each contain in two-columns of the credit card images 18. These "two-up" strips are indicated by reference numeral 46 in FIG. 2. The punch press 44 cuts the two-up strips 42 into individual credit cards, one of which is indicated by reference numeral 48 in FIG. 2. It is capable of cutting four credit cards in one cutting operation and thus reduces a two-up strip 42 into individual credit cards 48 in six cutting operations.

The guillotine unit 42 includes a guillotine 50 that has a base frame 52, a guillotine table top 54 and a shear blade unit 56. The shear blade unit 56 is capable of movement in the direction of the arrow labeled "B" in FIG. 3 in order to cut the printed plastic sheets 12*a*. It has a movable cutting blade 58 that mates with a stationary cutting blade 59 mounted on the guillotine table top 54.

The printed plastic sheets 12*a* are delivered to the guillotine 50 for cutting from a lift unit 60. The lift unit 60 consists of a double sheet loading table 62 which enables multiple printed plastic sheets 12*a* to be fed into the guillotine 50 from one side while new sheets are loaded onto the other side. FIG. 3 shows one side of the table 62 positioned to load sheets into the guillotine 50. FIG. 4 shows portions of both sides of the table 62. The table 62 can be raised and lowered by a motor driven screw jack (not shown) to enable the uppermost printed plastic sheet 12*a* to be fed into guillotine 50. As the printed plastic sheets 12*a* are fed from the top, the jack raises the table to maintain a constant feed height. When the last sheet has been fed from one side the table lowers and the top is indexed pneumatically to the other side of the table for continued sheet feed-off. This motion is indicated by the arrow "A" in FIG. 4.

A vacuum sheet feed head 70 is used to transport the printed plastic sheets 12*a* individually from the lift unit 60 to the guillotine 50. It is mounted on two parallel shafts, one of which is shown by reference numeral 72 in FIG. 3, that extend from the guillotine 50 out over the lift unit 60. The feed head 70 supports a vacuum suction unit 74 that includes four vacuum suction cups, one of which is shown in FIG. 3 by reference numeral 76. The suction cups are mounted on small pneumatic lift cylinders, one of which is shown in FIG. 3 by reference numeral 78. Each lift cylinder drives its respective suction cup in the direction indicated by the arrow "C" to pick up the uppermost printed plastic sheet 12*a*. As the suction cups are lowered to pick up the sheet, vacuum is applied to the cups to secure them to the sheet. When a predetermined vacuum level is reached, the suction cups are raised and slightly rotated to assist sheet separation. Further assistance is provide by a blast of air across the edge of the printed plastic sheets at the same time.

When the uppermost printed plastic sheet 12*a* has been raised, the vacuum sheet feed head 70 transports the sheet to a sheet indexing unit 80. This unit consists of a bar 82 mounted parallel to the guillotine table top 54. The bar 82 has side gripper assembly 84 mounted on each side thereof. The side gripper assemblies 84 includes small flat feet 86, onto which the printed plastic sheet 12*a* is fed, and a small clamping cylinder (not shown) which grips the sheet 12*a* as it is moved. The sheet indexing unit 80 is mounted on a linear bearing unit (not shown) and is capable of movement back and forth in the direction of the arrow "D". The sheet indexing unit feeds the printed plastic sheet 12*a* in a controlled fashion into the guillotine, where it is repeatedly cut into the two-up strips.

As each two-up strip is cut, it exits the guillotine unit 42 and enters the punch press unit 44. As stated above, the punch press unit 44 punches credit cards out of the two-up strips. It includes a support table 90 with a conveyor 92 mounted thereon for transporting the two-up strips from the guillotine 50 to a punching tool unit 94. Alternatively, a manual feed system may be used. The punching tool unit 94 moves in the direction of the arrow "E" in FIG. 4 to punch the individual credit cards. The punch press unit 44 automatically indexes the two-up strip through the punching tool unit 94 and the waste skeleton is ejected out for disposal. The credit cards, when punched from the two-up strip, are ejected onto a conveyor 96 which delivers them into either a stacking unit (not shown) for manual boxing or into an adjacent inspecting machine (not shown).

Figure 5:
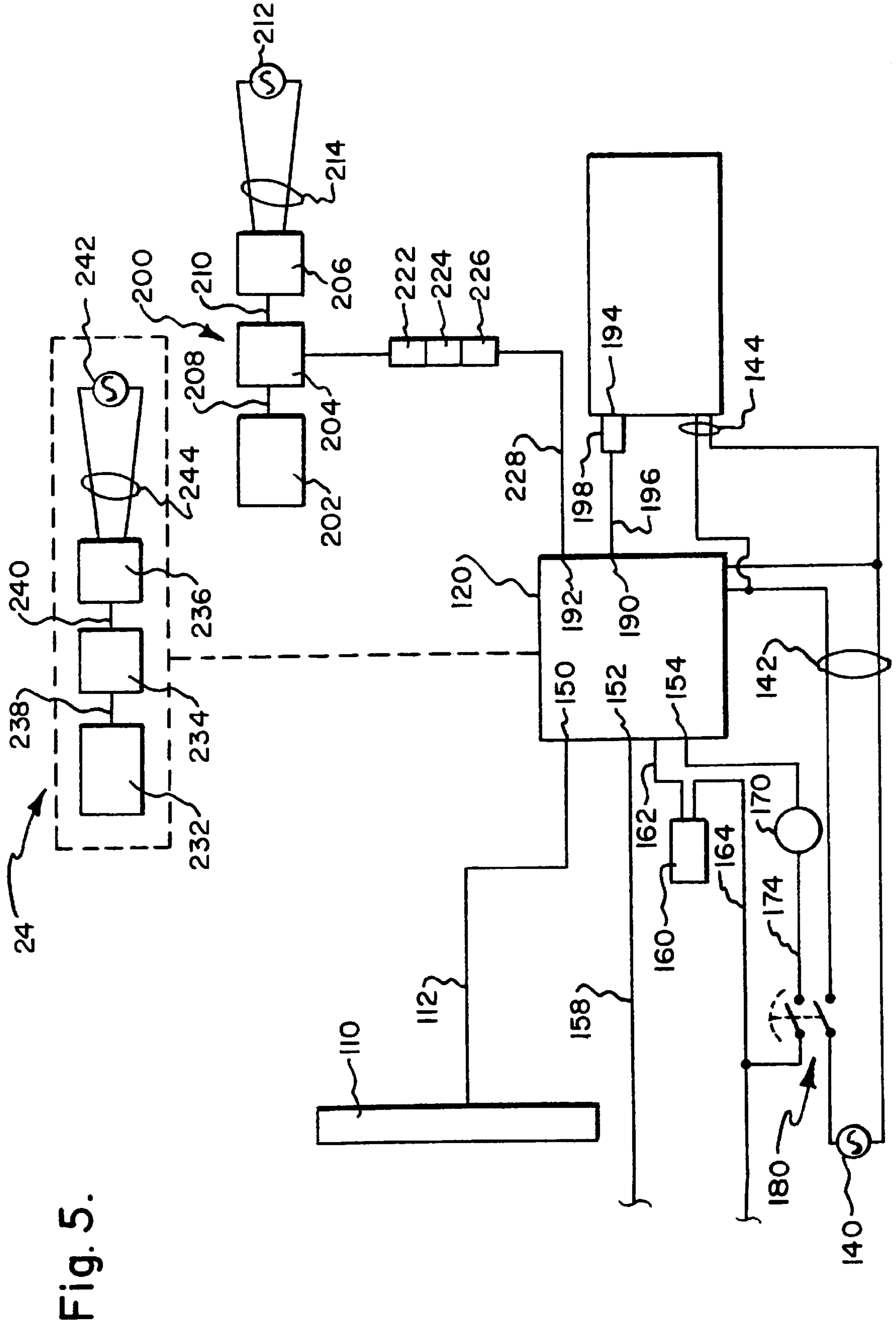
FIG. 5 is a schematic representation of a printed plastic card job control system constructed in accordance with the present invention.

Referring now to FIG. 5, the invention is illustrated as it is intended to operate in accordance with the preferred embodiment in a plastic printing card stock control system 100. The control system 100 provides an apparatus and method for preventing operation of the cutting apparatus 40, and particularly the guillotine unit 42, unless the job number 22 on the printed plastic sheet 12*a* is correct or a properly authorized employee has requested a system override.

In FIG. 5, reference numeral 110 represents a programmable controller that controls the operations of the guillotine unit 42. The guillotine controller 110 may be provided by various commercially available control systems, including the C20 programmable controller from Omron Tateisi Electronics Co. of Osaka, Japan. The guillotine controller 110 operates by monitoring input signals from various hardware components of the guillotine unit 42, such as pushbuttons, sensors and limit switches. When changes in these signals are detected, the guillotine controller reacts based on user-programmed internal logic (e.g., relay ladder diagram logic), to produce output signals. The output signals operate the external loads of the guillotine unit 42, such as relays, motor controls, indicator lights and alarms.

In order to prevent operation of the guillotine unit 42 until the job number 22 is verified to be correct, or an authorized employee has requested an override, a selected output signal from the guillotine controller 110 is diverted from its return path to the guillotine unit 42 and directed for further processing. While various output signals could be used, it is preferable to interrupt the operation of the guillotine unit 42 as soon as possible after an opportunity to scan the job number 22 has occurred. An ideal output signal for this purpose is the "lift cylinder down" signal that is carried on the signal line 112 shown in FIG. 5. This control signal is output by the guillotine controller 110 to cause the lift cylinders of the guillotine unit 42 to lower the vacuum suction cups onto the uppermost printed plastic sheet 12.

The lift cylinder down signal line 112 is normally connected to solenoids that control the lift cylinders. In accordance with the invention, the output signal line 112 is redirected from the lift cylinder solenoids to a job controller 120. The job controller 120 is preferably a programmable digital processing device although other controller types, such as relay driven controllers, could also be used. Programmable digital processing controllers are commercially available and include the 2600 XM Controller from Control Technology Corporation of Hopkinton, Mass. As shown in FIG. 6, this controller functionally includes a central processing unit (CPU) 121, a program memory 122, storage registers 123, counters 124, flags 125, a digital input/output system 126 including one or more serial communication ports, a control signal input/output system 127 including one or more input and output terminals, and a bus 128 connecting the central processing unit 121, the program memory 122, the storage registers 123, the counters, 124, the flags 125, the digital input/output system 126 and the control signal input/output system 127. The job controller 120 runs under the control of an operating system and one or more user-generated control programs, which are stored in the program memory 122.

In the control system 100, the job controller 120 operates in conjunction with an operator interface 130. The operator interface 130 serves as an intelligent input/output device that transmits data and control information to the job controller 120, and produces outputs based on information received from the job controller 120. It could either be constructed as part of the job controller 120 or separate therefrom as shown in FIG. 5. Such devices are commercially available and include the 4160 Operator Interface from Control Technology Corporation. As shown in FIG. 7, the operator interface 130 functionally includes a central processing unit (CPU) 131, a program memory 132, a message, control and protocol memory 133, an alphanumeric display 134, an LED array 135, an input keypad 136, a digital input/output system 137 including at least one serial communication port, and a bus 138 connecting the central processing unit (CPU) 131, the program memory 132, the message, control and protocol memory 133, the alphanumeric display 134, the LED array 135, the input keypad 136, and the digital input/output system 137.

The operator interface 130 operates under a software program stored in the program memory 132. This program uses information stored in the message, control and protocol memory 133 to communicate with the job controller 120 and performs various input/output functions. The operator interface 130 performs its input functions by transferring data and control inputs entered via the keypad 136 to designated storage registers 123 of the job controller 120. The operator interface performs its output functions by displaying prerecorded messages that are stored in the message, control and protocol memory 133. Message selection is determined by information stored in a designated message identification register 123 of the job controller 120.

Returning now to FIG. 5, the job controller 120 and the operator interface 130 receive power from a standard 120 VAC power source 140 through power cords 142 and 144, respectively. Each device has an internal power supply (not shown) providing a +5 volt d.c. logic supply voltage for digital operations. In addition, the power supply for the job controller 120 provides a +24 volt d.c. I/O supply voltage for controlling analog input and output. The job controller 120 includes a plurality of control signal input terminals, one of which is shown by reference numeral 150 in FIG. 5. It also includes a plurality of control signal output terminals, two of which are shown by reference numerals 152 and 154 in FIG. 5. A “common” or “return” terminal 156 provides a 0 volt reference point. Each input terminal is internally self-powered from the controller’s +24 volt power supply. The controller can sense when any of the input terminals have been pulled down to return by a switch closure. The output terminals are also +24 volt in order to power electronic sensors and other devices that may be connected thereto. Devices with their own power supply may also be connected to the output terminals.

The input terminal 150 of the job controller 120 is connected to the line 112 carrying the “lift cylinder down” signal from the guillotine controller 110. The return terminal 156 of the job controller 120 is connected via a line 158 to the “common” terminal of the guillotine controller 110. The output terminal 152 of the job controller 120 is connected to one side of the lift cylinder solenoid 160 via a line 162. The other side of the lift cylinder solenoid 160 is connected via a line 164 to a +24 volt source on the guillotine unit 42. The output terminal 154 of the job controller 120 is connected to one side of an alarm 170 via a line 172. The other side of the alarm 170 is connected via a line 174 to an emergency stop switch 180.

The job controller 120 includes a pair of RS232 serial ports 190 and 192. The serial port 190 provides a digital communication path to the operator interface 130, which has its own serial port 194. The ports 190 and 194 are connected via a communication line 196 and a modular jack adaptor 198.

The serial port 192 is used to communicate with a bar code scanning system 200. The bar code scanning system 200 includes a scanner 202, a decoder adapter box 204 and a power supply 206. Such devices are commercially available from a variety of sources, including Microscan Systems, Inc. of Renton, Wash. The components of the scanning system 200 are connected together via lines 208 and 210. The power supply 206 is connected to a standard 120 VAC source 212 via a power cord 214. The scanner 202 is shown in FIG. 3 as it would be mounted for scanning the uppermost printed plastic sheet 12 on the guillotine table 62. It is preferably a scanning type bar code reader that is configured for movement in one or more predetermined scanning directions, such as the direction indicated by arrow “F” in FIG. 3.

The adapter box 204 converts the bar code scanning data output of the scanner 202 into ascii character format. The ascii characters are transmitted to the serial port 192 of the job controller 120 via a 9-lead line 220, a 9-pin gender changer 222, a 9-pin null modem connector 224, a modular jack adaptor 226, and a 4-line phone cable 228. The phone cable 228 plugs into the serial port 192 of the job controller 120.

FIG. 5 further illustrates that the scanning system 24, which is used to check the printing plate 17 for a correct job number, could be controlled by the job controller 120 instead of the processing apparatus 26. In that case, the scanning system 24 would direct its output, which is also in ascii format, to the job controller 120 via a serial communication line 230. The scanning system 24 would either share the communications port 192 with the scanning system 200 (since these scanning systems would typically communicate with the job controller 120 at different times), or a new communications port could be added to the job controller. FIG. 5 further shows that the scanning system 24 can be constructed like the scanning system 200 to include a scanner 232, an adaptor box 234, and a power supply. The components of the scanning system 24 are connected together via lines 238 and 240. The power supply 236 is connected to a standard 120 VAC source 242 via a power cord 244.

The job control system 100 operates under the control of a software program stored in the job controller’s program memory 122 to perform several functions which ensure that mismatched printed plastic sheets 12 are not cut by the cutting device 40, such that the cards 48 produced thereby are not mixed with cards from other jobs. The software program can be written in any suitable programming language, but is preferably written using the DSP Quickstep language, which provides a comprehensive programming and diagnostic environment for Control Technology Corp. controllers. The source code for this software program is attached for reference purposes in the Appendix hereto. FIGS. 6–10 illustrate the functional elements of the software program and the sequential executable steps it performs as it controls the operations of the control system 100. The job controller's hardware and operating system software provide an environment in which the software program controls system operations by processing data and control information stored in selected ones of the registers 123. For example, data and control values received from the keypad 136, the scanning system 200 and the input terminal 150, are stored into selected ones of the registers 123, which values are processed by the software program to perform the operations of the system. Similarly, by placing data and control values in certain other ones of the registers 123, the software program can generate messages on the alphanumeric display 134, control the scanning system 200, and control the output terminals 152 and 154.

Figure 8:
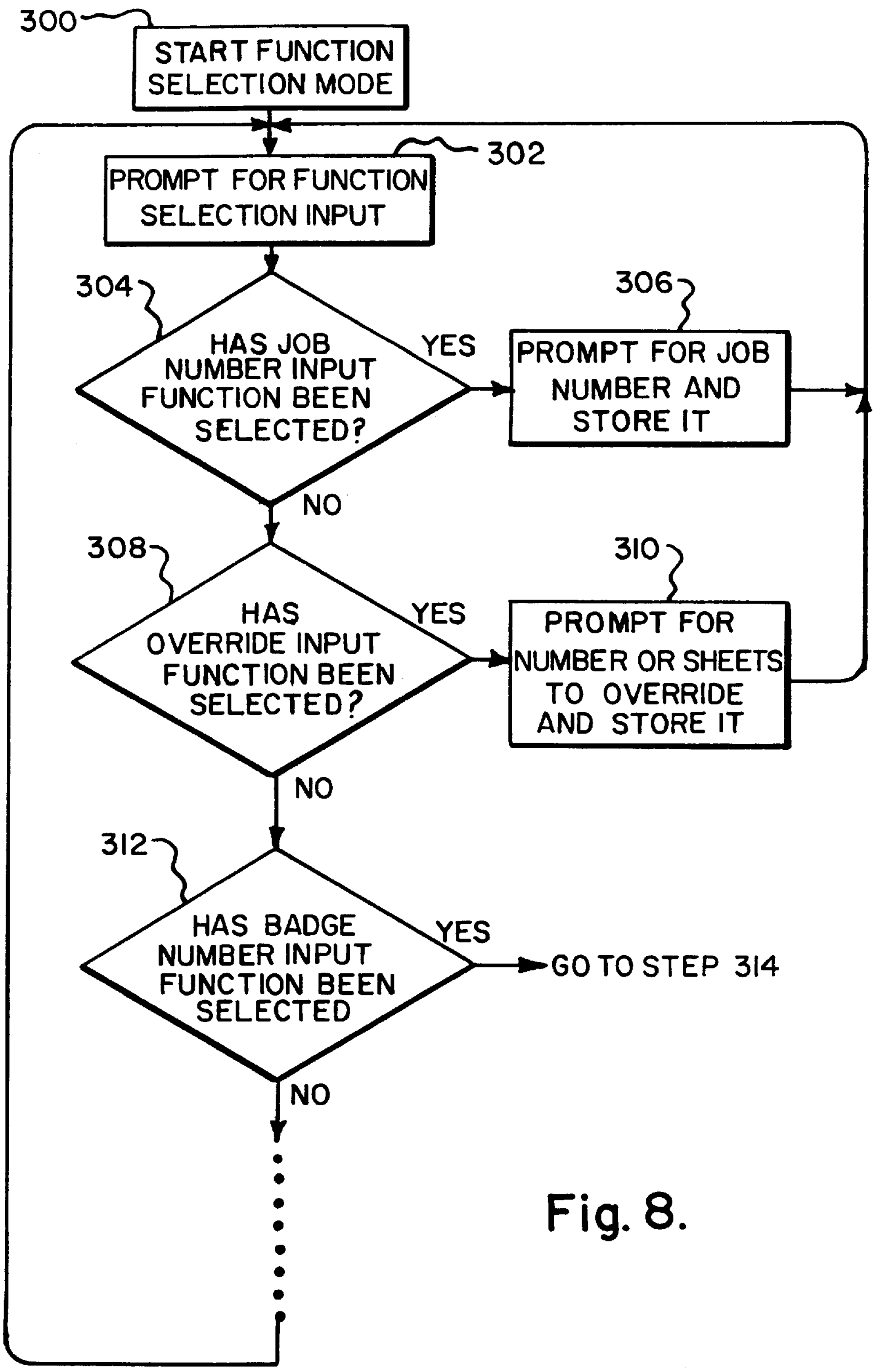
FIG. 8 is a flow diagram showing process steps performed by the printed plastic card job control system of FIG. 5.

Referring now to FIG. 8, the program initializes itself following system power-up to enter the Function Selection mode in Step 300. In the Function Selection mode, the alphanumeric display 134 is driven to display a message that prompts the operator to select one of several available operating functions. These functions include a job number entry function, an override amount function, and a badge number entry function. In Step 304, the program tests whether the job number entry function has been selected. When this function is selected in Step 304, the program proceeds to Step 306 and drives the alphanumeric display 134 to display a message that prompts the operator to input a job number. When the job number has been entered, it is stored in one of the registers 123 and the program returns to Step 302. In Step 308, the program tests whether the override amount function has been selected. The override amount tells the system how many sheets an authorized supervisor wishes to cut regardless of job number. When this function is selected in Step 308, the program proceeds to Step 310 and drives the alphanumeric display 134 to display a message that prompts the operator to input the number of sheets to override. When the override amount has been entered, it is stored in one of the registers 123 and the program returns to Step 302. In Step 312, the program tests whether the badge number entry function has been selected. When this function is selected in Step 312, the program proceeds to the Badgescan mode in Step 314.

Figure 9:
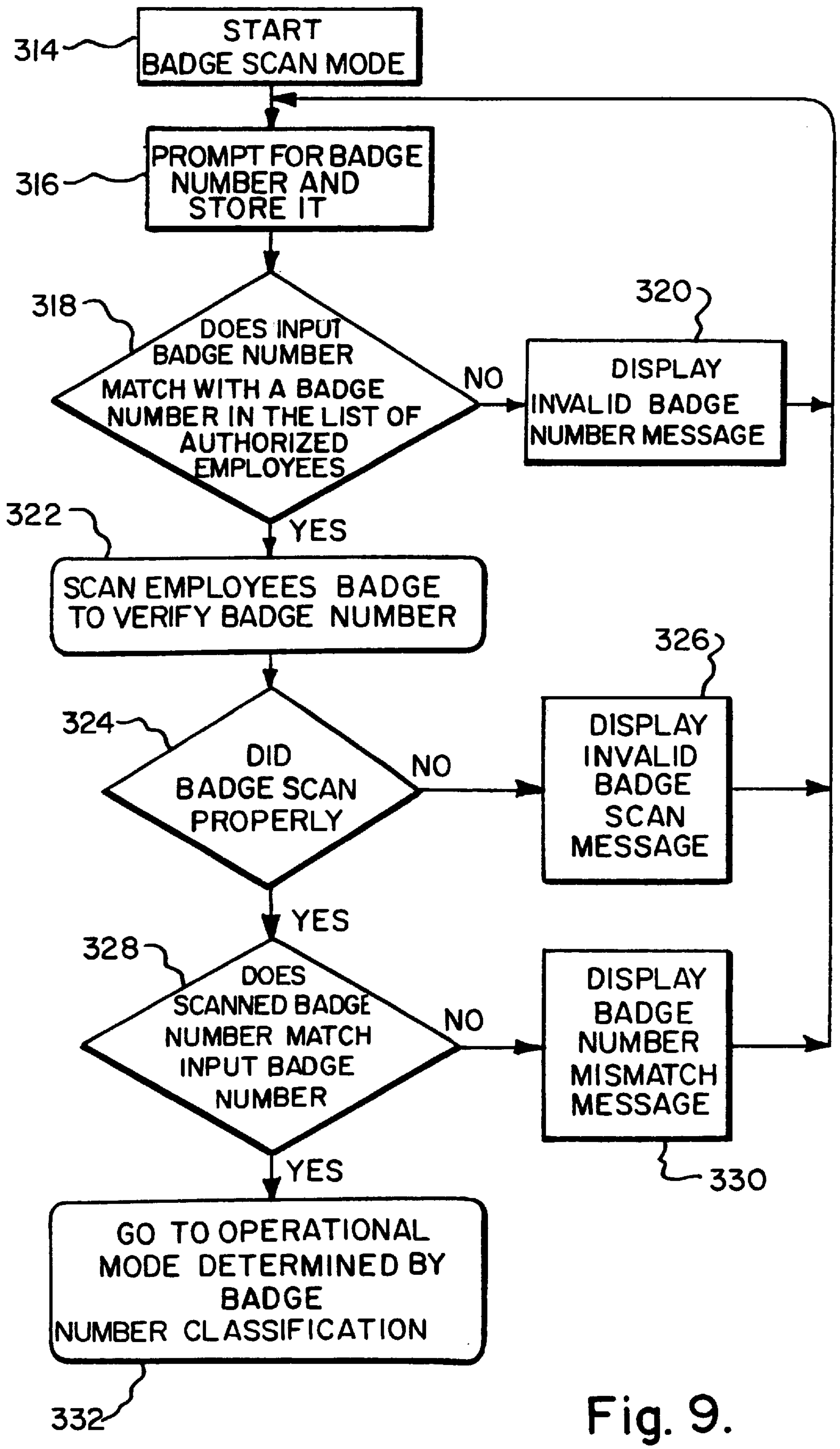
FIG. 9 is a flow diagram showing additional process steps performed by the printed plastic card job control system of FIG. 5.

Referring now to FIG. 9, the program proceeds from step 314 to step 316, where it drives the alphanumeric display 134 to display a message that prompts the operator for the operator's badge number. When the badge number has been entered, it is stored in one of the registers 123. In Step 318, the program compares the operator's badge number with a stored list of badge numbers corresponding to authorized employees. If a match is not found in Step 318, the program drives the alphanumeric display 134 to display an invalid badge number message in Step 320, and then returns to Step 316 to again prompt the operator for an employee badge number. If a match is found in Step 318, the program proceeds to Step 322. In Step 322, the program activates the scanning system 200 to scan the employee's badge, which the employee will have previously placed below the scanner 202 on top of the uppermost printed plastic sheet 12. The program tests whether the employee's badge was scanned properly in Step 324. If not, the program proceeds to Step 326 and drives the alphanumeric display 134 to display an invalid badge scan message. The program then returns to Step 316 to again prompt the operator for an employee badge number. If Step 324 determines that a proper badge scan occurred, the program proceeds to Step 328 and tests whether the scanned badge number matches the badge number input by the operator. If it does not, the program proceeds to Step 330 and drives the alphanumeric display 134 to display a badge number mismatch message. The program then returns to Step 316 to again prompt the operator for an employee badge number. If Step 328 determines that the scanned badge number matches the input badge number, the program proceeds to Step 332. In Step 332 the program branches depending on the operator's employee classification as encoded in the operator's badge number.

Figure 10:
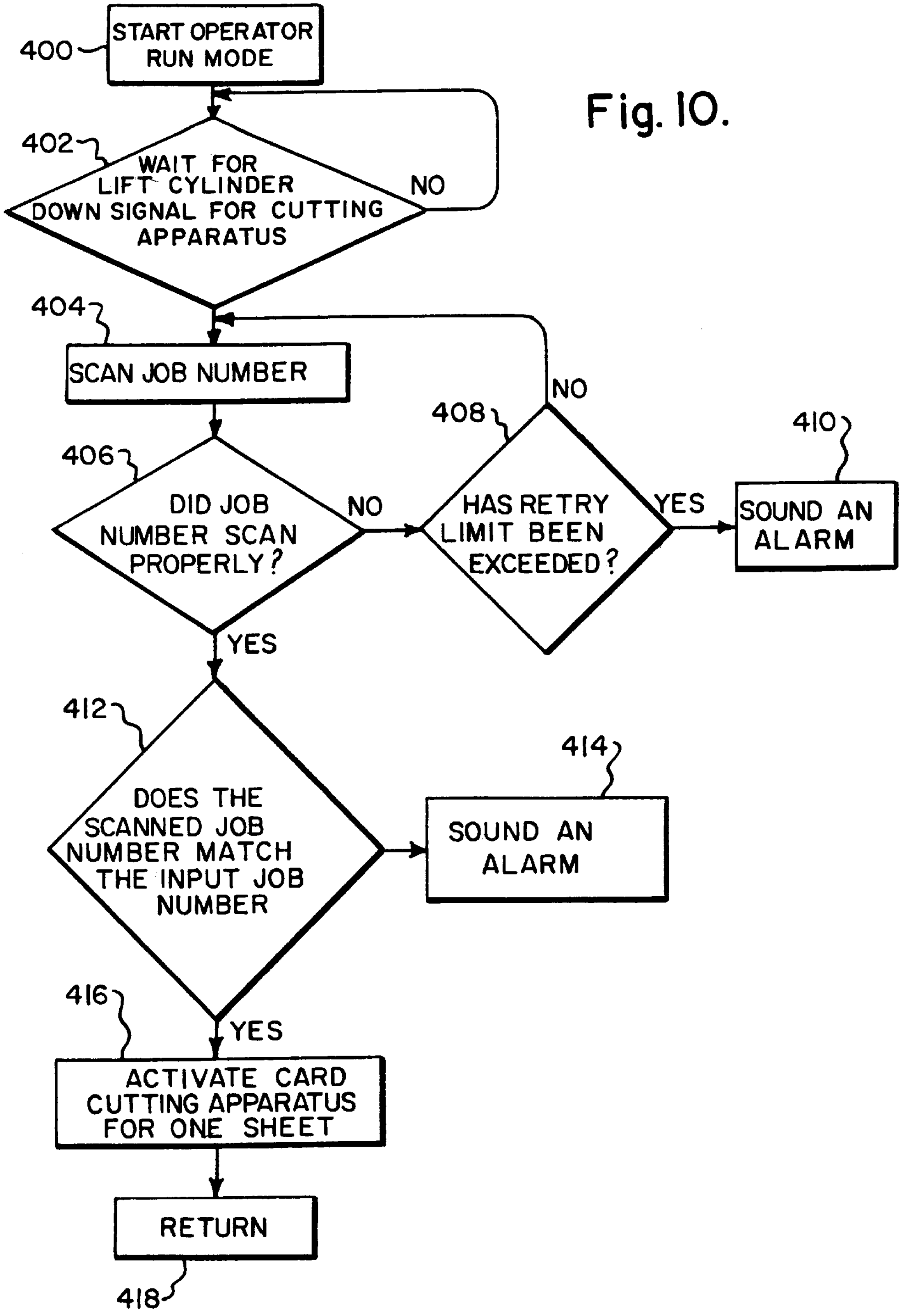
FIG. 10 is a flow diagram showing additional process steps performed by the printed plastic card job control system of FIG. 5.

Referring new to FIG. 10, the program enters the Operator Run mode in Step 400 if the operator's badge, number indicates that the operator is an authorized cutting machine operator. The program proceeds to Step 402 to wait for the "lift cylinder down" signal from the cutting apparatus 40. When it is received, indicating that the operator has activated the guillotine unit 42 to begin cutting one or more printed plastic sheets 12, the program proceeds to Step 404. In this step, the program activates the scanning system 200 to scan the job number 22 on the uppermost printed plastic sheet 12. In Step 406, the program tests whether the job number was properly scanned. If it was not, the program checks in Step 408 whether a selected number of job number scanning attempts have been made. If not, the program returns to Step 404 to scan again. If a selected number of scanning attempts (e.g., three) have been made, and failed, the program activates the alarm 170 in Step 410. If the job number is determined in Step 406 to have been scanned successfully, the program proceeds to Step 412. In this step, the program tests whether the scanned job number matches the job number previously input by the operator. If the job numbers do not match, the program activates the alarm 170 in Step 414. If the job numbers are determined in Step 412 to match, the program activates the lift cylinder solenoid 160 in Step 416 so that cutting of the uppermost printed plastic sheet 12 is initiated. When lift cylinder operations are completed on this sheet, the lift cylinder is deactivated. The program then proceeds Step 418 and returns to Step 400 repeat the procedure with the next printed plastic sheet 12.

Referring now to FIG. 11, the program enters the Lamination Supervisor Run mode in Step 500 if the operator's badge number indicates that the operator is an authorized lamination supervisor. Lamination supervisors are allowed to cut a single printed plastic sheet for test purposes regardless of whether the sheet has a proper job number printed thereon. Thus in Step 502, the program waits for the lift cylinder down signal from the guillotine unit 42. When it is received, the program proceeds to Step 504 and activates the lift cylinder solenoid 160 so that the uppermost printed plastic sheet in the guillotine unit is cut. The program the proceeds to Step 506, where it is directed to return to Step 500.

Referring now to FIG. 12, the program enters the Supervisor Run mode in Step 600 if the operator's badge number indicates that the operator is an authorized supervisor. Supervisors are allowed to cut multiple plastic sheets that do not have correct job numbers thereon, in effect overriding the job numbers. Thus in Step 602, the program waits for the lift cylinder down signal from the guillotine unit 42. When it is received, the program proceeds to Step 604 and activates the lift cylinder solenoid 160 so that a selected number of printed plastic sheets in the guillotine unit are cut. This number is the override amount previously input in Step 310.

When the specified number of printed plastic sheets 12 have been cut, the program the proceeds to Step 606, where it is directed to return to Step 600.

Accordingly, a printed plastic card job control system has been described. The disclosed software program operates with the above-described hardware to provide a job control system that prevents the mixing of unauthorized plastic sheet stock in a printed plastic card production run. The system dictates that no mismatched sheet stock will be processed except in limited controlled circumstances involving employees who have been verified to the system as authorized operators.

While various embodiments have been disclosed, it should be apparent that many variations and alternative embodiments would be apparent to those skilled in the art in view of the teachings herein. For example, the job control system of the invention could be implemented using hardware or firmware control, rather than software control. It is understood, therefore, that the invention is not to be in any way limited except in accordance with the spirit of the appended claims and their equivalents.

What is claimed is:

1. A job control system for manufacturing printed plastic cards, comprising:

a printing apparatus for placing information on a sheet of plastic card stock material, including predetermined job control number indicia, to produce a job-encoded printed plastic card sheet;

a cutting apparatus adapted for cutting said job-encoded printed plastic card sheet into a plurality of printed plastic cards;

a job controller for controlling said cutting apparatus;

an operator interface for inputting information to and outputting information from said job controller;

a scanning device for reading the job control number indicia on a job-encoded sheet placed in said cutting apparatus and inputting said indicia to said job controller as a scanned job control number;

first control means in said job controller for receiving an input job control number from said operator interface and storing it as a stored job control number;

second control means in said job controller for activating said scanning device in response to said cutting apparatus receiving a start command from an operator to scan a job encoded sheet placed in said cutting apparatus;

third control means in said job controller for receiving said scanned job control number from said scanning de vice and comparing said scanned job control number to said stored job control number to produce a job control number comparison result;

fourth control means in said job controller responsive to said job control number comparison result being true for causing said job controller to allow said cutting apparatus to operate;

fifth control means in said job controller responsive to said job control number comparison result being false for causing said job controller to prevent said cutting apparatus from operating and to generate an alarm signal signifying that an incorrect sheet of plastic card stock material has been placed in said cutting apparatus;

sixth control means in said job controller for receiving an input operator identification number from said operator interface and storing it as a stored operator identification number;

seventh control means in said job controller for activating said scanning device to scan an operator identification number on an operator's employment identification badge;

eighth control means in said job controller for receiving said scanned operator identification number and comparing it to said stored operator identification number to produce an operator identification number comparison result;

ninth control means in said job controller responsive to said operator identification number comparison result being true for causing said job controller to allow said cutting apparatus to operate; and tenth control means in said job controller responsive to said operator identification number comparison result being false for causing said job controller to prevent said cutting apparatus from operating and to generate an alarm signal signifying that an operator identification number mismatch occurred.

2. A job control system in accordance with claim 1 wherein said job controller comprises an electronic digital processing device and each of said control means comprises one or more executable software program instruction steps.

3. A job control system in accordance with claim 1 wherein said operator interface and said job controller are separate components.

4. A job control system in accordance with claim 1 wherein said job control number indicia is a bar code and wherein said scanning device is a bar code reader.

5. A job control system in accordance with claim 4 wherein said bar code reader is a scanning bar code reader.

6. A job control system in accordance with claim 4 wherein said scanning device further includes a decoder for converting scanned bar code information into ASCII characters.

7. A job control system in accordance with claim 1 wherein said job control system further comprises:

one or more supervisory operator identification numbers stored in said job controller;

eleventh control means in said job controller for comparing said stored operator identification number to said stored supervisory operator numbers to produce a supervisory operator number comparison result; and twelfth control means in said job controller responsive to said supervisory operator number comparison result being true for causing said job control apparatus to override said fifth control means and allow said cutting apparatus to operate on a predetermined number of printed plastic card sheets notwithstanding that said sheets are not encoded with said input job control number.

8. A job control system in accordance with claim 7 wherein said predetermined number is one sheet.

9. A job control system in accordance with claim 7 wherein said printing apparatus includes a printing plate for printing said job-encoded printed plastic card sheet, and a scanning device for scanning said printing plate prior to printing said job-encoded printed plastic card sheet to verify that said job control number indicia on said printing plate corresponds to said job control number.

10. A job control system in accordance with claim 1 wherein said job control number indicia is printed in one or more regions of said sheet of plastic card stock material used for color bar and cutting apparatus markings, and not in regions used for said printed plastic cards.

11. A job control system in accordance with claim 1 wherein said job control number indicia is printed in regions of said sheet of plastic card stock material that are used for said printed plastic cards.

12. A job control method for manufacturing laminated printed plastic cards, comprising the steps of:

providing a printing apparatus for placing information on a sheet of plastic card stock material, including predetermined job control number indicia, to produce a job-encoded printed plastic card sheet;

providing a cutting apparatus adapted for cutting said job-encoded printed plastic card sheet into a plurality of printed plastic cards;

providing a job controller for controlling said cutting apparatus;

providing an operator interface for inputting information to and outputting information from said job controller;

providing a scanning device reading the job control number indicia on a job-encoded sheet placed in said cutting apparatus and inputting said indicia to said digital processing device as a scanned job control number;

controlling said job controller to receive an input job control number from said operator interface and store it as a stored job control number;

activating said scanning device in response to said cutting apparatus receiving a start command from an operator to scan a job encoded sheet placed in said cutting apparatus;

controlling said job controller to receive said scanned job control number from said scanning device and to compare said scanned job control number with said stored job control number to produce a job control number comparison result;

controlling said job controller in response to said job control number comparison result being true to allow said cutting apparatus to operate;

controlling said job controller in response to said job control number comparison result being false to prevent said cutting apparatus from operating and to generate an alarm signal signifying that a job number mismatch has occurred;

controlling said job controller to receive an input operator identification number from said operator interface and store it as a stored operator identification number;

controlling said job controller to activate said scanning device to scan an operator identification number on an operator's employment identification badge;

controlling said job controller to receive said scanned operator identification number and compare it to said stored operator identification number to produce an operator identification number comparison result;

controlling said job controller in response to said operator identification number comparison result being true to allow said cutting apparatus to operate; and controlling said job controller in response to said operator identification number comparison result being false to prevent said cutting apparatus from operating and to generate an alarm signal signifying that an operator identification number mismatch occurred.

13. A job control method in accordance with claim 12 wherein said job controller comprises an electronic digital processing device and each of said controlling steps comprises one or more executable software program instruction steps.

14. A job control method in accordance with claim 12 wherein said operator interface and said job controller are separate components.

15. A job control method in accordance with claim 12 wherein said job control number indicia is a bar code and wherein said scanning device is a bar code reader.

16. A job control method in accordance with claim 15 wherein said bar code reader is a scanning bar code reader.

17. A job control method in accordance with claim 15 wherein said scanning device further includes a decoder for converting scanned bar code information into ASCII characters.

18. A job control method in accordance with claim 12 wherein one or more supervisory operator identification numbers stored in said job controller, and wherein said job control method further comprises the steps of:

controlling said job controller to compare said stored operator identification number to said stored supervisory operator numbers to produce a supervisory operator number comparison result; and controlling said job controller responsive to said supervisory operator number comparison result being true to allow said cutting apparatus to operate on a predetermined number of printed plastic card sheets notwithstanding that said sheets are not encoded with said input job control number.

19. A job control method in accordance with claim 18 wherein said predetermined number is one sheet.

20. A job control method in accordance with claim 12 further including the step of making a printing plate for use in said printing apparatus, said printing plate being made with a photographic film sheet containing images to be formed on said printing plate, said images including said job control number indicia in machine readable form and in human readable form.

21. A job control method in accordance with claim 20 wherein only said job control number indicia in machine readable form and not said job control number indicia in human readable form is formed on said printing plate.

22. A job control method in accordance with claim 20 wherein said printing apparatus includes a scanning device and said printing plate is scanned prior to printing said job-encoded printed plastic card sheet to verify that said job control number indicia in machine readable form corresponds to said job control number.

23. A job control method in accordance with claim 12 wherein said job control number indicia is printed in one or more regions of said sheet of plastic card stock material used for color bar and cutting apparatus markings, and not in regions used for said printed plastic cards.

24. A job control method in accordance with claim 12 wherein said job control number indicia is printed in regions of said sheet of plastic card stock material that are used for said printed plastic cards.

25. A job control system for manufacturing laminated printed plastic cards, comprising:

a cutting apparatus for cutting job number-encoded sheets of plastic card stock;

a scanning device associated with said cutting apparatus for scanning said job number-encoded sheets of plastic card stock that have been loaded in said cutting apparatus and for producing a scanner output containing said job number encodation; and a control system responsive to said scanner output, to an input job control signal, and to an input operator classification signal for disabling said cutting apparatus from cutting said sheets of plastic card stock loaded therein unless said sheets of plastic card stock conform to a predetermined job specification or unless an operator having a suitable operator classification is operating said job control system.

* * * * *